(12) United States Patent
Bekiares et al.

(10) Patent No.: US 8,903,657 B2
(45) Date of Patent: Dec. 2, 2014

(54) SYSTEMS AND METHODS FOR CORRELATING ROUTES OF MOBILE DEVICES

(75) Inventors: Tyrone D. Bekiares, Chicago, IL (US);
Timothy J. Collins, Homer Glen, IL (US); Trent J. Miller, West Chicago, IL (US); Deborah J. Monks, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 160 days.

(21) Appl. No.: 13/562,465

(22) Filed: Jul. 31, 2012

(65) Prior Publication Data

US 2014/0039790 A1 Feb. 6, 2014

(51) Int. Cl.
*G01C 21/00* (2006.01)
*G08B 1/08* (2006.01)
*H04W 4/00* (2009.01)

(52) U.S. Cl.
USPC ............... 701/521; 340/539.13; 370/328

(58) Field of Classification Search
CPC . G06Q 10/06; G06Q 20/3224; G06Q 20/382; G06Q 30/0205; H04L 67/12; H04L 67/18; H04W 4/02; H04W 4/026; H04W 4/18
USPC .............. 701/400–541; 455/457, 456.6; 340/539.13; 370/328
See application file for complete search history.

(56) References Cited

U.S. PATENT DOCUMENTS

| | | | |
|---|---|---|---|
| 6,028,550 A | 2/2000 | Froeberg et al. | |
| 7,363,117 B2 | 4/2008 | Tengler et al. | |
| 7,593,809 B2 | 9/2009 | Rosen et al. | |
| 7,826,409 B2 | 11/2010 | Mock et al. | |
| 7,991,549 B2 | 8/2011 | Kimita et al. | |
| 8,116,751 B2 | 2/2012 | Aaron | |
| 8,131,272 B2 | 3/2012 | Paalasmaa et al. | |
| 2002/0183077 A1 | 12/2002 | Fomukong | |
| 2006/0221893 A1* | 10/2006 | Kiss | 370/328 |
| 2008/0033637 A1 | 2/2008 | Kuhlman et al. | |
| 2009/0287407 A1* | 11/2009 | Sheha et al. | 701/201 |
| 2011/0142016 A1 | 6/2011 | Chatterjee | |
| 2011/0270519 A1 | 11/2011 | Park et al. | |

FOREIGN PATENT DOCUMENTS

EP 2222053 A1 8/2010

OTHER PUBLICATIONS

PCT International Search Report Dated Dec. 20, 2013 for Counterpart Application PCT/US2013/048873.

(Continued)

*Primary Examiner* — Muhammad Shafi
(74) *Attorney, Agent, or Firm* — Kenneth A. Haas (57) ABSTRACT

A route correlation method, an identification method, and a route correlation system determine an implicit relationship between two entities, i.e. two users with mobile devices, following dynamic, but similar paths or routes, but which otherwise lack an explicit relationship. Through this implicit relationship, the identity of one entity can be known to another. The route correlation method includes determining a route for a first mobile device, determining a route for each of a plurality of mobile devices, correlating the route for each of the plurality of mobile devices with the route for the first mobile device, identifying each of the plurality of mobile devices with their associated routes matching the route of the first mobile device, and associating each mobile device with an entity.

19 Claims, 9 Drawing Sheets

(56) References Cited

OTHER PUBLICATIONS

Joachim Gudmundsson, et al. "Efficient Detection of Patterns in 2D Trajactories of Moving Points", Geoinformatica: An International Journal on Advances of Computer Science for Geographic Information Systems, Kluwer Academic Publishers, BO, vol. 11 No. 2; Jan. 20, 2007, p. 195-215; XP019500918. ISSN:1573-7624-D01:10. 1007/S10707-006-0002-Z, p. 195-197.

Reinaldo Bezerra Braga, et al. "Clustering User Trajectories to Find Patterns for Social Interaction Applications", Web and Wireless Georgraphical Information Systems, Springer Berlin Heidelberg, Berlin, Heidelberg. vol. 7236, Apr. 12, 2012, Ages 82-97; XP019175665, ISBN:978-3-642-29246-0; p. 82-87.

Quannan Lit, et al. "Mining User Similarity Based on Location History", ACM GIS Nov. 5, 2008, p. 1-9, XP055068457, Irvine, CA, USA; ISBN:978-1-60558-323-5.

* cited by examiner

SYSTEMS AND METHODS FOR CORRELATING ROUTES OF MOBILE DEVICES

FIELD OF THE DISCLOSURE

The present disclosure relates generally to mobile communications and more particularly to systems and method for correlating routes of mobile devices to identify implicit relationships between two entities following dynamic, but similar paths or routes, but which otherwise lacks an explicit relationship.

BACKGROUND

Mobile device adoption through smart phones, tablets, etc. has become ubiquitous. The mobile devices communicate on a wireless network, and continuously publish a variety of statistics associated with their operation over time such as location (via global positioning system (GPS), proximate cell towers, etc.), accelerometer data, etc. Across enterprise, consumer, and public safety markets, there is a need to determine an implicit relationship between two entities following dynamic, but similar, routes. Such entities are unrelated and/or unknown to one another except for the dynamic, but similar, routes. For example, in the enterprise space, it would be advantageous to know that a person is on a particular (e.g., the 5:00 pm NW line) train (i.e., the person's route exhibits a high degree of correlation to the route of the train). In the public safety space, it would be advantageous for an officer to determine the identity of a chased suspect whose leading location and route is relatively similar to that of the trailing officer (displaced by a time offset).

Accordingly, there is a need for systems and methods of obtaining streams of parameters from mobile devices and correlating observed routes based thereon.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary embodiment, a route correlation method includes determining a route for a first mobile device, determining a route for each of a plurality of mobile devices, correlating the route for each of the plurality of mobile devices with the route for the first mobile device, and identifying each of the plurality of mobile devices with their associated routes approximately matching the route of the first mobile device. The route correlation method can further include receiving a plurality of parameters for the first mobile device and each of the plurality of mobile devices, storing the plurality of parameters each with a timestamp associated therewith, and determining the route for the first mobile device and for each of the plurality of mobile devices based on the plurality of parameters and the timestamps associated therewith.

In another exemplary embodiment, an identification method includes determining a route for a first mobile device associated with a public safety practitioner, determining a set of mobile devices associated with citizens within a predetermined radius of the first mobile device, determining a route of each mobile device in the set of mobile devices, and identifying each mobile device and associated user in the set of mobile devices with an associated route exhibiting a required correlation with the route of the first mobile device.

In yet another exemplary embodiment, a route correlation system includes a network interface communicatively coupled to at least one wireless network, a processor communicatively coupled to the network interface, and memory storing instructions that, when executed, cause the processor to receive a plurality of parameters from a first mobile device and a plurality of mobile devices, determine a route for the first mobile device from the plurality of parameters associated therewith, determine a first subset of mobile devices of the plurality of mobile devices having correlation with the first mobile device, determine a route for each of the first subset of mobile devices, and determine a second subset from the first subset based on route correlation therebetween.

Figure 1:
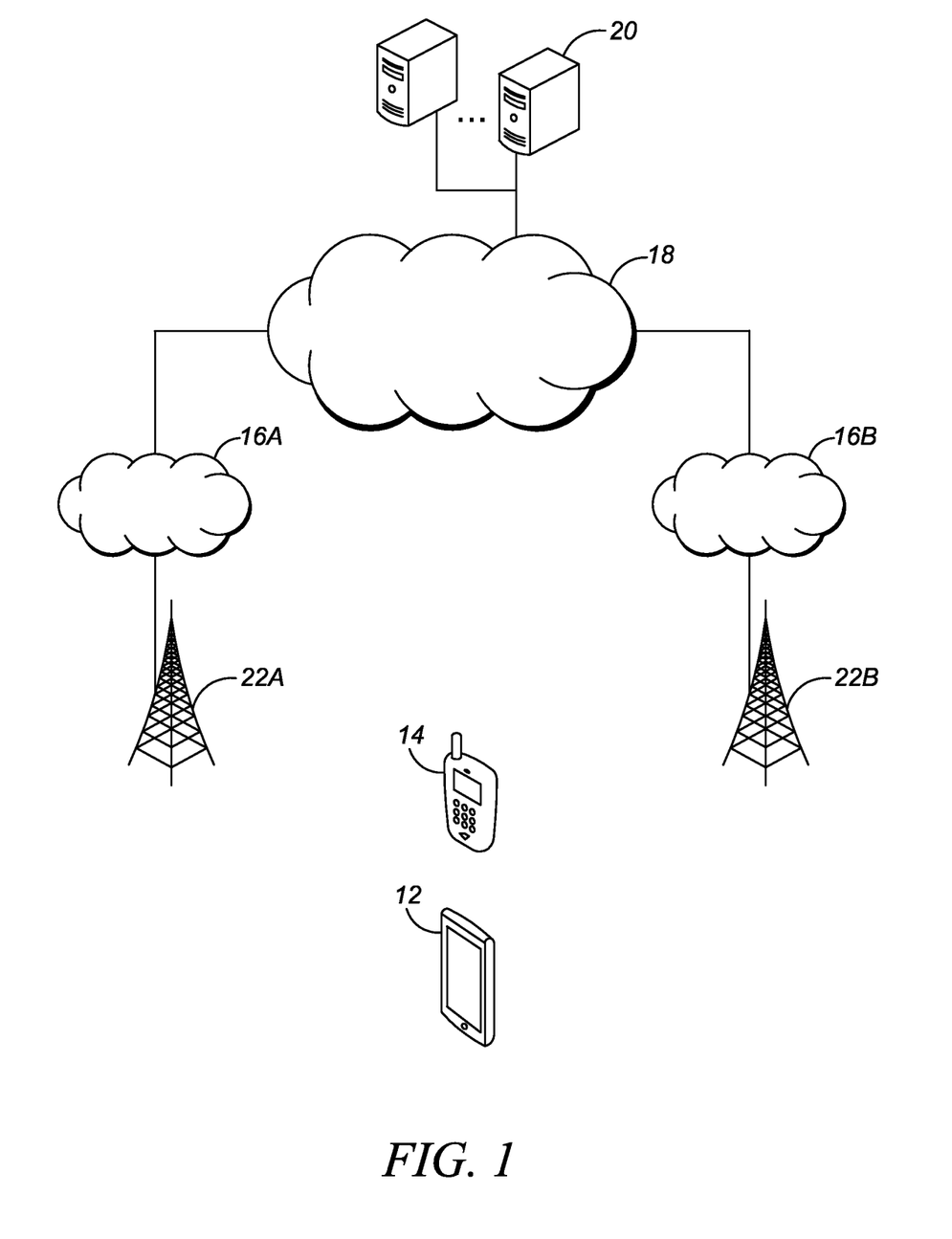
FIG. 1 is a network diagram of a system for correlating routes of mobile devices to identify implicit relationships between mobile devices following dynamic, but similar paths or routes in accordance with some embodiments.

Referring to FIG. 1, in an exemplary embodiment, a network diagram illustrates a system 10 for correlating routes of mobile devices to identify implicit relationships between mobile devices 12, 14 following dynamic, but similar paths or routes. The mobile devices 12, 14 are communicatively coupled to wireless networks 16A, 16B which are communicatively coupled to a network 18 and a server 20. Although not shown, there may be one or more servers 20 associated with each wireless network. The servers can communicate with one another through network 18. The wireless networks 16A, 16B can be the same or different network, and the mobile devices 12, 14 can connect to the wireless networks 16A, 16B via base stations 22A, 22B. In an exemplary embodiment, the mobile device 12, 14 could both be connected to the wireless network 16A. Alternatively, the mobile device 12 could be connected to the wireless network 16A and the mobile device 14 could be connected to the wireless network 16B. The mobile devices 12, 14 can be smart phones, cell phones, tablet devices, netbooks, ultrabooks, laptops, mobile radios, portable radios, embedded location devices, etc. and each has a set of parameters associated therewith such as location, heading, direction, orientation, speed, etc. That is, each of the mobile devices 12, 14 is portable and associated with an entity (e.g., a user or a train) and their location can be defined through the parameters over time. Further, these parameters can be provided to server 20 via the wireless network 16A, 16B. As described herein, the system 10 includes the mobile devices 12, 14 and entities associated therewith. Each entity may be a person, a vehicle, etc., for example, and the mobile devices 12, 14 are always physical devices. Ultimately, with the system 10, the systems and methods described herein are correlating routes between entities, by correlating routes between the mobile devices 12, 14.

In various exemplary embodiments, the system 10 is configured to determine an implicit relationship between two entities following dynamic, but similar paths or routes, but which otherwise lack an explicit relationship. The term route is used herein to indicate a combination of time-stamped present location, present heading, present speed, historical location, historical heading, historical speed, etc. for a given mobile device. That is, the mobile devices 12, 14 can be configured to provide a plurality of parameters to the server 20, and the plurality of parameters can include present location, present heading, present speed, present orientation, etc. The plurality of parameters can be used to determine a route for each of the mobile devices 12, 14 over time. The server 20 can use the location, heading, speed, orientation, etc. over time (i.e., each of these parameters can have an associated time stamp) to determine the mobile devices 12, 14 route.

Routes may be streamed in real-time (e.g., a receiving device can construct a route given a stream of present location, heading, and speed). For example, the server 20 is communicatively coupled to and/or part of the wireless networks 16A, 16B and can be configured to receive the parameters for the mobile devices 12, 14 and for a plurality of additional mobile devices. The server 20 can implement algorithms to correlate routes of a plurality of mobile devices to detect candidate mobile devices that match a known route of a mobile device. For example, assume the mobile devices 12, 14 are proceeding on the same route and the mobile device 12 is with a known user, then the server 20 can be configured to determine if the mobile device 14 is using the same route and provide information to the user of the mobile device 12 such as an identity of the user of the mobile device 14. Using the server 20, given a first route for a first device, and a set of routes for other devices, the server 20 can search the set of routes, determine a subset of routes from the set of routes with a high correlation to the first route, thus determining a subset of devices which are following a same route as the first device.

The server can further associate each device with an entity (e.g., a user or vehicle), thus determining a subset of entities which are following a same route as the first entity.

In an exemplary embodiment, the server 20 can include a network interface communicatively coupled to at least one wireless network. For example, the server 20 can be connected to a plurality of different wireless provider networks such that the mobile devices 12, 14 can be correlated despite being on different networks. The server 20 can also include a processor communicatively coupled to the network interface and memory storing instructions that, when executed, cause the processor to perform various steps. That is, the server 20 can be configured, through execution by the processor of the instructions, to receive a plurality of parameters from a first mobile device and a plurality of mobile devices. For example, the first mobile device can be the mobile device 12 and the plurality of mobile devices can include the mobile device 14 and other devices. The server 20 can determine a route for the first mobile device from the plurality of parameters associated therewith. The server 20 can determine a first subset of mobile devices of the plurality of mobile devices having correlation with the first mobile device, determine a route for each of the first subset of mobile devices, and determine a second subset from the first subset based on route correlation therebetween.

Figure 2:
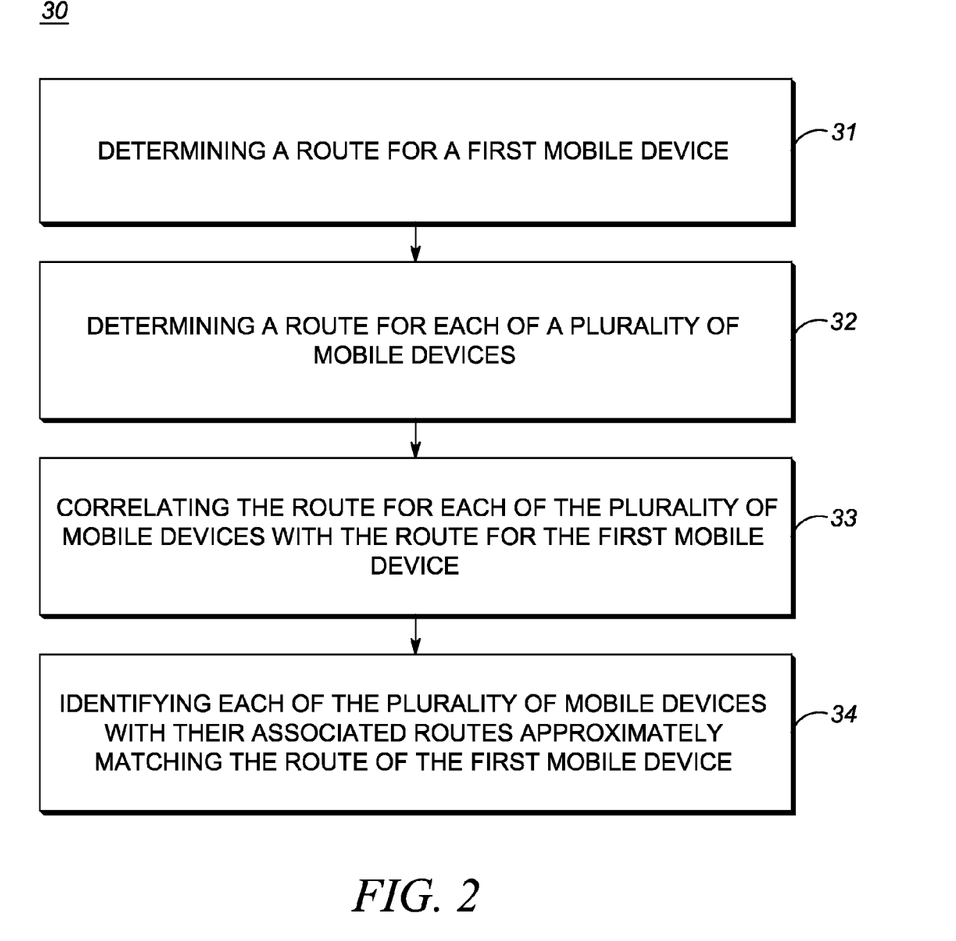
FIG. 2 is a flowchart of a method which can utilize the system of FIG. 1 in accordance with some embodiments.

Referring to FIG. 2, in an exemplary embodiment, a flowchart illustrates a route correlation method 30 which can utilize the system 10. In an exemplary embodiment, the method 30 can be implemented by the server 20 which is communicatively coupled to the mobile devices 12, 14 such as through a network interface. The server 20 can include a processor communicatively coupled to the network interface and memory storing instructions that, when executed, cause the processor to perform the steps associated with the method 30. Given a first route for a first device, and a set of routes for other devices, the method 30 provides a mechanism which will search the set of routes, determine a subset of routes from the set of routes with a high correlation to the first route, thus determining a subset of devices which are following a same route as the first device. It is appreciated that various exemplary embodiments of such an algorithm could exist.

The route correlation method 30 includes determining a route for a first mobile device (step 31). As described herein, the term route is used to indicate a combination of time-stamped present location, present heading, present speed, historical location, historical heading, historical speed, and the like for a given device. The first mobile device can include the mobile device 12 in FIG. 1 and can provide the plurality of parameters to the server 20 via the networks 16, 18. The method 30 includes determining a route for each of a plurality of mobile devices (step 32). The mobile device 14 in FIG. 1 can be one of the plurality of mobile devices along with various other devices. Optionally, the method 30 can restrict which devices are in the plurality of mobile devices using various filters such as location relative to the first mobile device, base station, speed, etc.

The method 30 includes correlating the route for each of the plurality of mobile devices with the route for the first mobile device (step 33). This correlating step is to find best matches in terms of routes between the first mobile device and the plurality of mobile devices. As described herein, the route has both a location component and a time component. Thus, two mobile devices could take similar spatial routes on different days, and thus would not be correlated from the perspective of the method 30. The method 30 is looking for routes that are correlated both spatially and temporally. Generally, two correlated entities are ones that have substantially similar locations over a substantially similar time period or a time offset of a predetermined amount. The correlating step includes each of the plurality of mobile devices in a candidate list which exhibit a required correlation in their routes to the route of the first mobile device. In an exemplary embodiment, the required correlation includes a predetermined distance between the devices at a predetermined time. In another exemplary embodiment, the required correlation for each of the plurality of mobile devices requires an instantaneous location of the first mobile device be approximately equal to a previous location of each of the plurality of mobile devices. The previous location of each of the plurality of mobile devices is a location measured at a bounded time differential with respect to the instantaneous location.

The method 30 includes identifying each of the plurality of mobile devices with their associated routes approximately matching the route of the first mobile device (step 34). As described herein, the matches are ones which are correlated in time and location. The method 30 produces a small subset of mobile devices whose route is highly correlated with the first mobile device, plus or minus a time offset of Y seconds. This can be used to determine an implicit relationship between two entities via their associated devices following dynamic, but similar paths or routes, but which otherwise lack an explicit relationship. For example, it may be advantageous to implicitly know that a person, via their associated mobile device, is on a particular (e.g., the 5:00 pm NW line) train or bus, and not just on a particular train line (e.g., the NW line). In this example, one of the mobile devices is associated with a patron and the other mobile device is associated with the train itself.

With the method 30, such information could be used to: automate check-in on a rail system, where passenger check-in is typically performed in a manual fashion once the train is in motion; automate billing on a commuter rail system, where passenger billing is typically performed in a manual fashion once the train is in motion; automate generation of a passenger manifest in the event of an accident; automate user check-in to social media sites, such as FourSquare and Facebook (e.g., "Ty is on a 5:00 pm NW train"); provide accurate estimated-time-of-arrival to a particular train stop from a mobile device mapping application; automate update of transit information for specialized packages (e.g., this package is on FedEx Truck #502, scheduled into Chicago at 5:00 pm); and the like. In these and other instances, it is advantageous to establish a relationship (e.g., making the identity of one entity known to another) between two or more entities following a similar route, separated by some time offset.

Figure 3:
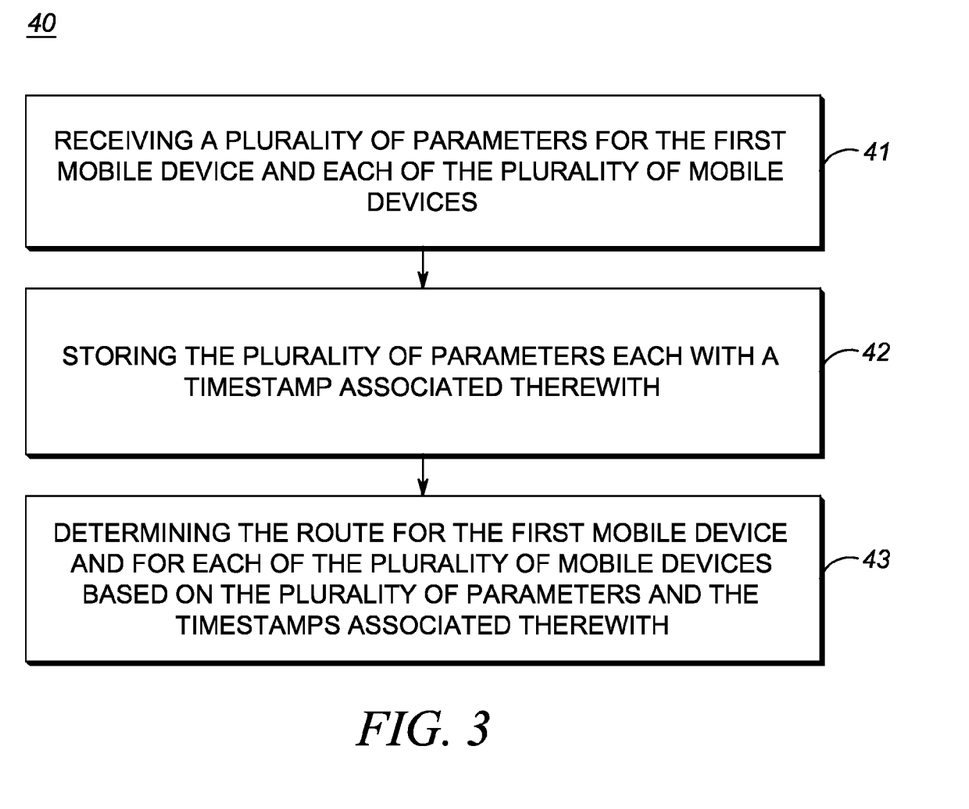
FIG. 3 is a flowchart of a server method which can utilize the system of FIG. 1 in accordance with some embodiments.

Referring to FIG. 3, in an exemplary embodiment, a flowchart illustrates a server method 40 which can utilize the system 10. In an exemplary embodiment, the method 40 can be implemented by the server 20 which is communicatively coupled to the mobile devices 12, 14 such as through a network interface. The method 40 can also be implemented in conjunction with the method 30. The method 40 includes receiving a plurality of parameters for the first mobile device and each of the plurality of mobile devices (step 41). As described herein, the first mobile device and the plurality of mobile devices can include smart phones, tablets, PDAs, netbooks, ultrabooks, etc. that have various devices included therewith for determining the plurality of parameters. The parameters can be associated with location, heading, direction, orientation, speed, etc. For example, the plurality of parameters can include Global Positioning Satellite data, cell tower location/base station location, wireless signal strength (to the cell tower/base station), accelerometer data, orientation data, speed, etc.

The method 40 includes storing the plurality of parameters each with a timestamp associated therewith (step 42). Note, the route for each mobile device can require at least two data points separated by a time offset for determination thereof. That is, the route is spatial location over time. The server 20 can be configured to store periodically various parameters and their timestamps. In an exemplary embodiment, the server 20 can store the parameters for a certain time period since the methods 30, 40 may be implemented in real-time or slightly thereafter to determine the implicit relationships. Note, it is expected that storing all parameters for all mobile devices may require significant resources. However, the need to determine implicit relationships between mobile devices is typically real-time as events happen or slightly thereafter (i.e., seconds or minutes, not days). Thus, the storage requirements may be reduced accordingly. The method 40 includes determining the route for the first mobile device and for each of the plurality of mobile devices based on the plurality of parameters and the timestamps associated therewith (step 43). For example, the route can be defined based on location and time such as using four dimensional coordinates (X, Y, Z, T) where X, Y, Z are physical location such as Cartesian coordinates and T is temporal location.

Figure 4:
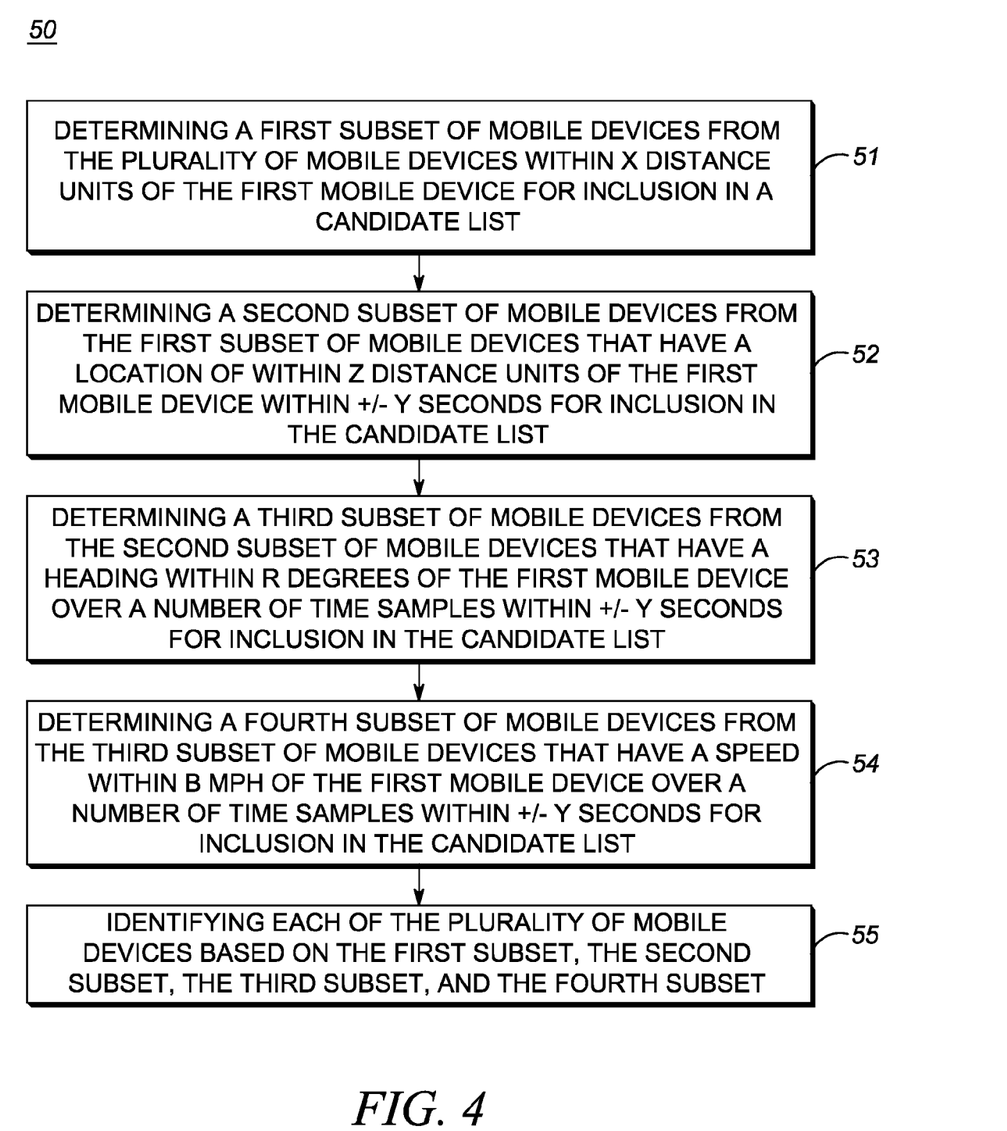
FIG. 4 is a flowchart of a candidate list method for determining the route correlation such as with the methods of FIGS. 2-3 and the system of FIG. 1 in accordance with some embodiments.

Referring to FIG. 4, in an exemplary embodiment, a flowchart illustrates a candidate list method 50 for determining the route correlation such as with the methods 30, 40 and the system 10. In an exemplary embodiment, the method 50 can be implemented by the server 20 which is communicatively coupled to the mobile devices 12, 14 such as through a network interface. The method 50 can also be implemented in conjunction with the methods 30, 40. In an exemplary embodiment, the method 50 can reduce the number of mobile devices in the correlating step 33 of the method 30. Also, the associated steps of the method 50 can be performed in any order, with steps omitted as appropriate. The method 50 includes determining a first subset of mobile devices from the plurality of mobile devices within X distance units of the first mobile device for inclusion in a candidate list (step 51). The step 51 can be used to eliminate mobile devices from the candidate list that are a certain distance away from the first mobile device and to include mobile devices in the candidate list that are within the certain distance.

The method 50 includes determining a second subset of mobile devices from the first subset of mobile devices that have a location of within Z distance units of the first mobile device within +/−Y seconds for inclusion in the candidate list (step 52). The step 52 can be used to eliminate mobile devices from consideration that are a certain distance, Z, away from the first mobile device within a certain time period, +/−Y seconds. Note, the X distance units in step 51 can be a larger amount than the Z distance units since the step 51 has no time component associated with it. For example, mobile devices kilometers apart are likely to not have an implicit relationship at present, while mobile devices meters apart may.

The method 50 includes determining a third subset of mobile devices from the second subset of mobile devices that have a heading within R degrees of the first mobile device over a number of time samples within +/−Y seconds for inclusion in the candidate list (step 53). The step 53 can be used to eliminate mobile devices from consideration that are oriented or heading away from the first mobile device. For example, the heading can be defined as North, South, East, West, Northwest, etc. The method 50 includes determining a fourth subset of mobile devices from the third subset of mobile devices that have a speed within B mph of the first mobile device over a number of time samples within +/−Y seconds for inclusion in the candidate list (step 54).

The step 54 can be used to eliminate mobile devices from consideration that are moving at vastly different speeds from the first mobile device. Notably, the step 54, which examines speed at various points in time, would reject passengers in cars on a street or highway which closely parallel the first mobile device on a train line (e.g., they would not be stopping at every station). The method 50 includes identifying each of the plurality of mobile devices based on the first subset, the second subset, the third subset, and the fourth subset (step 55). Note, the step 55 can be any of the first subset, the second subset, the third subset, the fourth subset, or a combination thereof.

With the method 50, it is possible to determine a relationship between a moving train (first entity) and a passenger (second entity) on that train (from the subset of people within X distance units of the train), for example. Also, in the methods 30, 40, 50 and the system 10, the route for the first mobile device includes an arbitrary route not tied to a particular road or static route. That is, the route does not have to follow a defined road as is done with GPS, but can be any arbitrary path. For example, GPS-related systems are configured to match physical location against predetermined maps of streets and roadways. The present disclosure has no such limitation in that the routes can be dynamic and not tied to preexisting routes.

Figure 5:
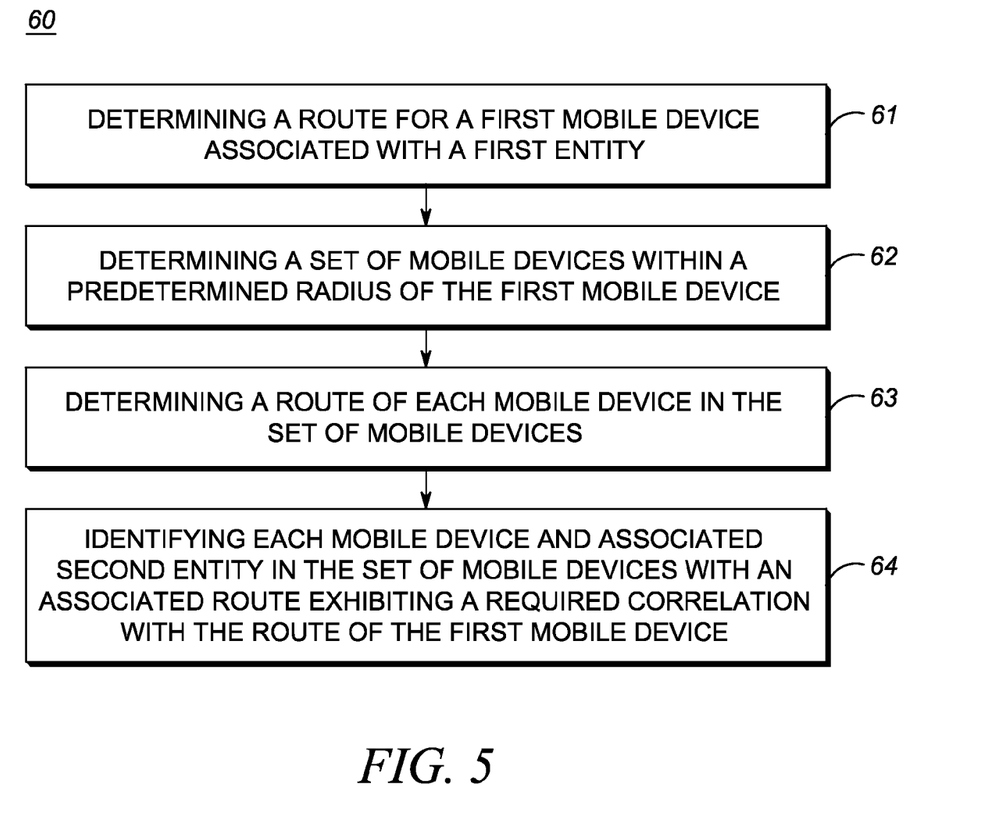
FIG. 5 is a flowchart of an identification method for identifying a suspect based on an implicit relationship which can utilize the system of FIG. 1 in accordance with some embodiments.

Referring to FIG. 5, in an exemplary embodiment, a flowchart illustrates an identification method 60 for identifying users based on an implicit relationship. In an exemplary embodiment, the method 60 can be implemented by the server 20 which is communicatively coupled to the mobile devices 12, 14 such as through a network interface. The server 20 can include a processor communicatively coupled to the network interface and memory storing instructions that, when executed, cause the processor to perform the steps associated with the method 60. Within the public safety market, there exists a need for an officer to determine the identity of an unknown suspect whose leading location and route is relatively similar to that of the trailing officer (displaced largely by a time offset). For example, an officer may be running after a suspect, or walking some distance behind a suspect (i.e., shadowing a suspect), or following a suspect's vehicle in their own vehicle. In this instance, if the officer's identity and location/route is known to a first system, and the suspect's identity and location/route is known to a second system, a route correlation mechanism can determine, from a set of candidate suspects on the second system (e.g., people within some distance of the officer), which one is the suspect being chased.

The method 60 includes determining a route for a first mobile device associated with a first entity (step 61). Again, the term route is the same as described herein. The first entity can be public safety practitioner such as a police officer, a federal agent, a military member, or the like. Also, the second entity can be a non public safety practitioner (e.g., a suspect being chased by an officer). The method 60 includes determining a set of mobile devices within a predetermined radius of the first mobile device (step 62). The step 62 looks for all proximate mobile devices to the public safety practitioner to form the set of mobile devices. The method 60 includes determining a route of each mobile device in the set of mobile devices (step 63). Finally, the method 60 includes identifying each mobile device and associated second entity in the set of mobile devices with an associated route exhibiting a required correlation with the route of the first mobile device (step 64). Note, the method 60 can be used to identify who the registered user is of each identified mobile device. The required correlation may be one, some, or all of the steps disclosed in methods 30, 40, 50.

In an exemplary embodiment, the method 60 is an exemplary application of the system 10 and the methods 30, 40, 50. Here, the first mobile device can be associated with an agency Automatic Vehicle Location (AVL) system, for example. It is assumed in context of the method 60 that the public safety practitioner is in pursuit or trailing a suspect. The route of the suspect may be known to a second system (but not the first system). For example, the suspect's route may be "passively" known (e.g., the location is not actively published by a suspect's device) to a second system (e.g., a commercial cellular provider) via Long Term Evolution (LTE) location services (LCS). Alternatively, the suspect's device may be actively publishing (e.g., a Google Latitude client) route information to a second system (e.g., Google Latitude). In instances where the suspect is driving, the latter case could also extend to systems such as OnStar and the like.

To determine the identity of the suspect, once engaged in a chase of a suspect, the route of the officer is manually (e.g., via an emergency button press or some other initiation mechanism) or automatically (e.g., based on accelerometer data) streamed to a first system (e.g., an agency's AVL system) by the officer's device. For example, the first system can be the server 20 and the officer's broadband device can be the mobile device 12 in FIG. 1. The route of the officer, known to the agency's AVL system, can be streamed from the agency to another server 20 resident in one or more commercial cellular and location service providers (i.e., the second system) known to service the current location of the officer (and thus the suspect) via a CALEA (Lawful Intercept function). If the second system is a cellular system, the route of all active subscriber devices in a given cell/sector can be passively determined by server 20 through Radio Frequency (RF) triangulation (in a LTE system, this is feature of the LCS service) or the like. A set of active devices known to be connected to a cell/sector serving the officer's location (and thus that of the suspect) is determined. The LCS service is queried at periodic intervals for the current location of each device in the set of active devices. Over a short period of time, this produces a set of routes corresponding to the set of active devices in the immediate area of the officer.

The methods 30, 40, 50 can then be used by server 20 to compare the set the set of routes against the stream of the officer's route to determine if any device from the set of active devices is following approximately the same route (with appropriate time delay) as that of the chasing officer's device. If no matching route is found, and the second system is a cellular system, the operator of the cellular system may issue a Control Channel Alert (i.e., C-MASS) broadcast on all of the base stations of the second system servicing the current location of the officer (e.g., typically 3-5 sectors). This will bring all idle devices into an active state, at which point the aforementioned steps can be repeated. Alternatively, the operator may perform an authentication challenge to all idle devices known to be in the area (e.g., typically 3-5 sectors) of the current location of the officer. This will bring those idle devices into an active state, at which point the aforementioned steps can be repeated.

If the second system is a location system in which devices actively publish their location (e.g., Google Latitude or OnStar), such a system maintains a periodically updated "last known location" of devices. A set of devices with a last known location within some distance of the officer's location (and thus that of the suspect) can be determined. These devices can then be commanded to begin reporting their location at a faster cadence; alternatively, these devices may be queried for their current location at periodic intervals. Over a short period of time, this produces a set of routes corresponding to the set of active devices in the immediate area of the officer. The methods 30, 40, 50 can then be used by server 20 to compare the set the set of routes against the officer's route stream to determine if any device from the set of active devices is following approximately the same route (with appropriate time delay) as that of the chasing officer's device. If a matching route is found, the identity of the suspect (e.g., known to the second system through billing records or though a registration process) is returned to the first system (the agency).

Figure 6:
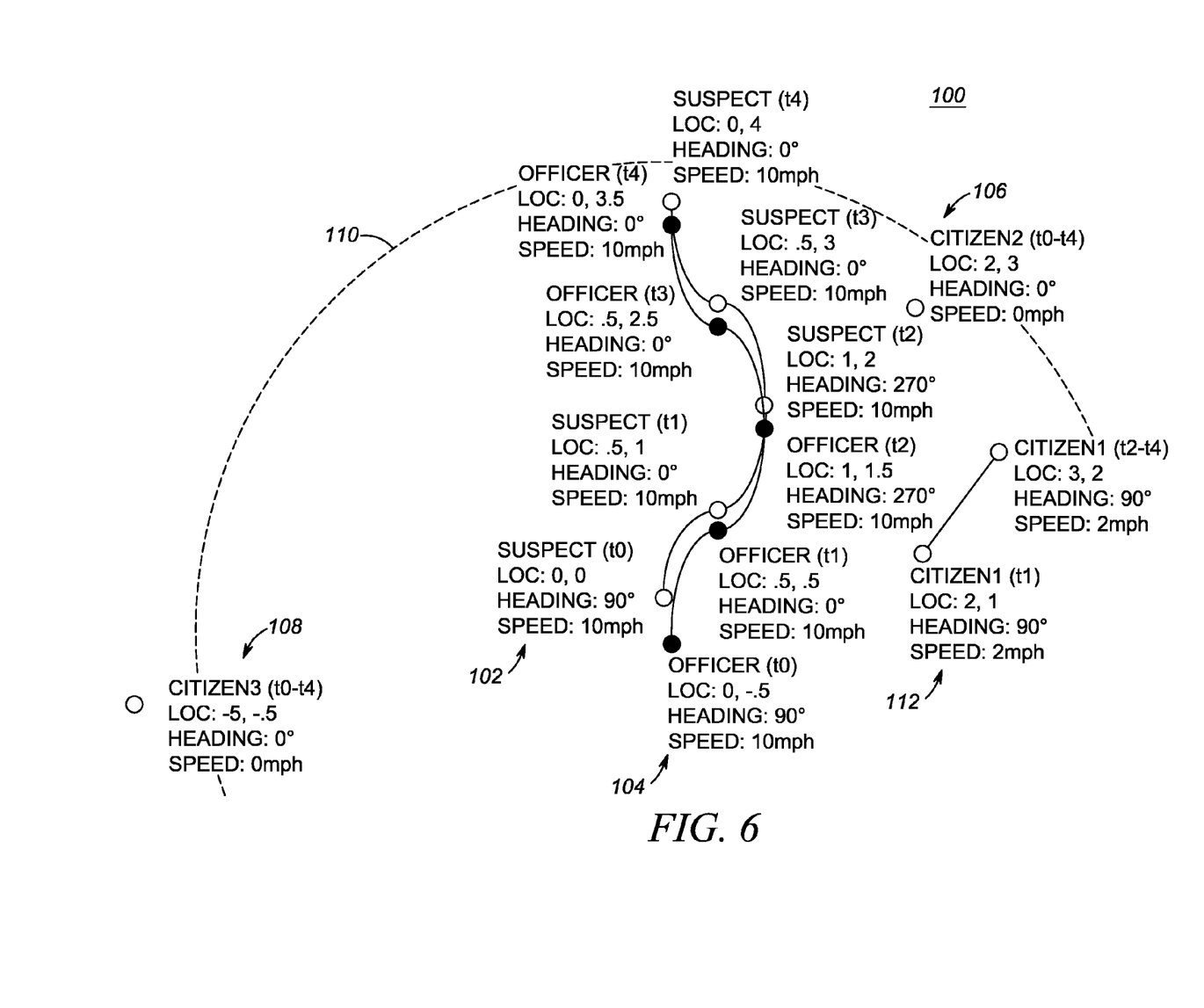
FIG. 6 is a diagram of an exemplary operation of the methods of FIGS. 2, 3, 4, and 5 with respect to identifying a suspect relative to an officer in accordance with some embodiments.

Referring to FIG. 6, in an exemplary embodiment, a diagram illustrates an exemplary operation 100 of the methods 30, 40, 50, 60 with respect to identifying a suspect 102 relative to an officer 104. To start at time $t_0$, the officer 104 is chasing or trailing the suspect 102 and both have the same heading (90°) and speed (10 mph) with slightly different locations ({0,0} vs. {0,−0.5}). At this time $t_0$, there are also citizens 106, 108 in the vicinity. Initially, the citizen 106 is within a zone 110 at the time $t_0$, but the citizen 108 is outside the zone 110. Thus, at time $t_0$, the citizen 108 can be excluded but the citizen 106 cannot. At time $t_1$, again the officer 104 and the suspect have the same heading (now 0°) and speed (still 10 mph) with slightly different locations ({0.5,1} vs. {0.5,0.5}). The citizen 106 is not moving and has the same heading and speed from time $t_0$ to $t_1$ (as well through times $t_2$, $t_3$, and $t_4$). Thus, the citizen 106 can be excluded. A new citizen 112 appears at time $t_1$ within the zone 110. At time $t_2$, again the officer 104 and the suspect have the same heading (now 270°) and speed (still 10 mph) with slightly different locations ({1,2} vs. {1,1.5}). The citizen 112 has moved to a different location but has slower speed and a different heading. Thus, the citizen 112 can be excluded. At times $t_3$ and $t_4$, the officer 104 and the suspect 102 continue to have similar routes offset by time. Thus, the officer 104 and the suspect 102 have correlated routes as described herein.

Figure 7:
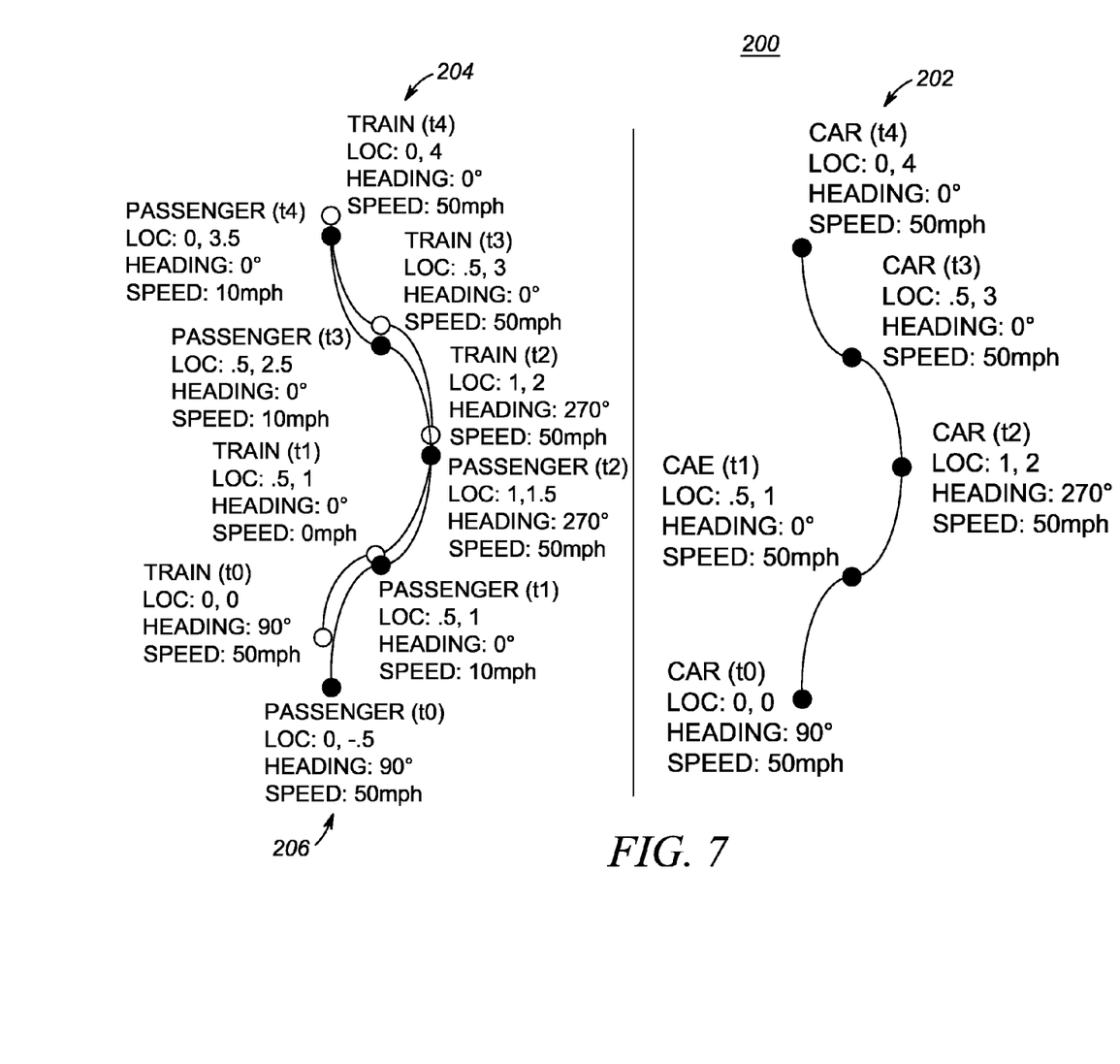
FIG. 7 is a diagram of an exemplary operation of the methods of FIGS. 2, 3, 4, and 5 with respect to identifying implicit relationships between a car, a train, and a passenger in accordance with some embodiments.

Referring to FIG. 7, in an exemplary embodiment, a diagram illustrates an exemplary operation 200 of the methods 30, 40, 50, 60 with respect to identifying implicit relationships between a car 202, a train 204, and a passenger 206. The passenger 206 is physically on the train 204. Note, there is a slight distance offset between the train 204 and the passenger 206 due to the passenger 206 being located this distance away from a mobile device associated with the train 204. The train 204 can have a mobile device configured thereon or one associated with a conductor, etc. The car 202 has the same physical path, but exhibits a different speed at time $t_1$ from the train 204 and the passenger 206 thereby excluding the car from having a correlated route with the train 204 and the passenger 206. Note, with respect to the suspect 102, the officer 104, the citizens 106, 108, 112, the car 202, the train 204, and the passenger 206, these are all entities with the mobile devices 12, 14 associated therewith for performing the various methods described herein.

Figure 8:
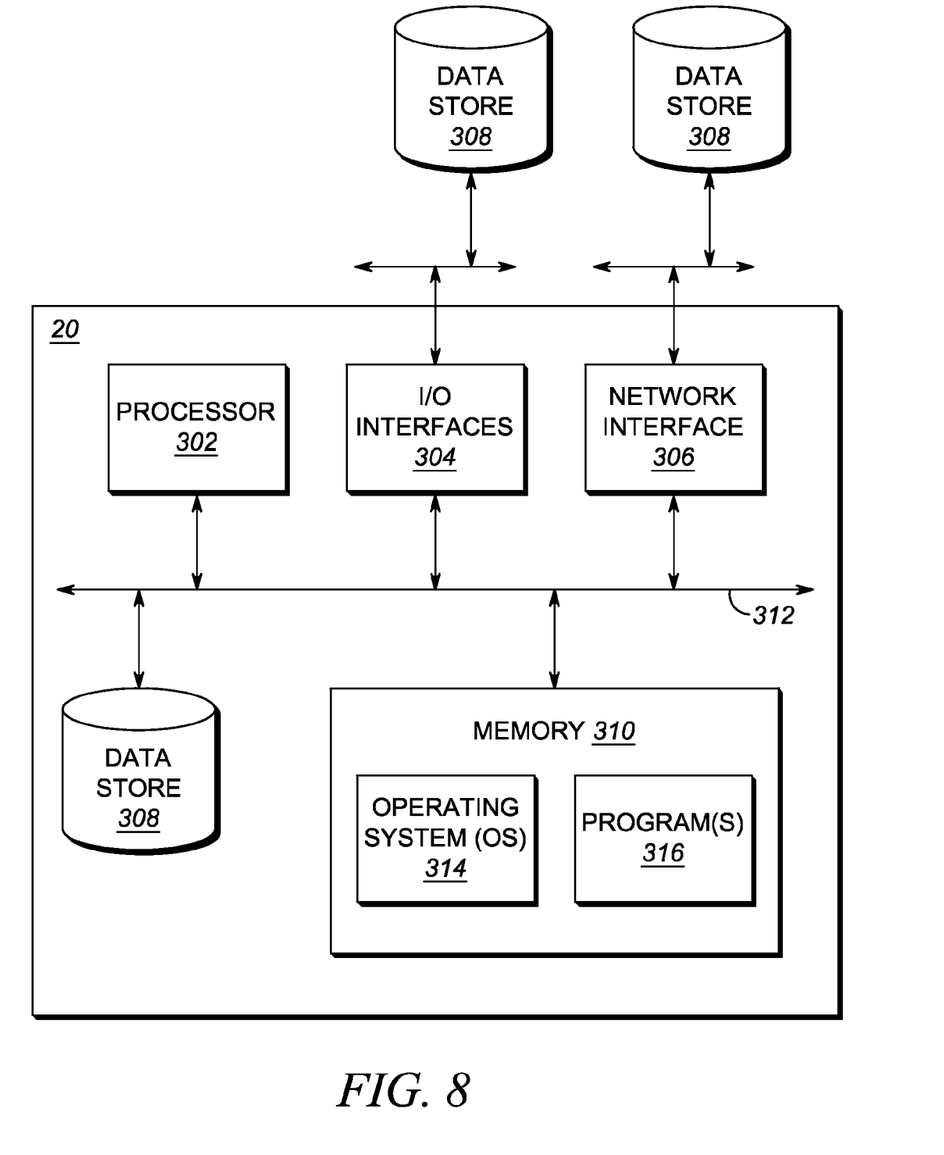
FIG. 8 is a block diagram of a server for use in the system of FIG. 1, the methods of FIGS. 2, 3, 4, and 5, and the exemplary operations of FIGS. 6-7 in accordance with some embodiments.

Referring to FIG. 8, in an exemplary embodiment, a block diagram illustrates the server 20 for use in the system 10 and the methods 30, 40, 50, 60. The server 20 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 8 depicts the server 20 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 302 is configured to execute software stored within the memory 310, to communicate data to and from the memory 310, and to generally control operations of the server 20 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 20 to communicate on a network, such as the networks 16, 18 to receive parameters associated with mobile devices. The network interface 306 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 20 such as, for example, an internal hard drive connected to the local interface 312 in the server 20. Additionally in another embodiment, the data store 308 can be located external to the server 20 such as, for example, an external hard drive connected to the I/O interfaces 304 (e.g., SCSI or USB connection). In a further embodiment, the data store 308 can be connected to the server 20 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. For example, the programs 316 can be configured to enable the methods 30, 40, 50, 60 described herein.

Figure 9:
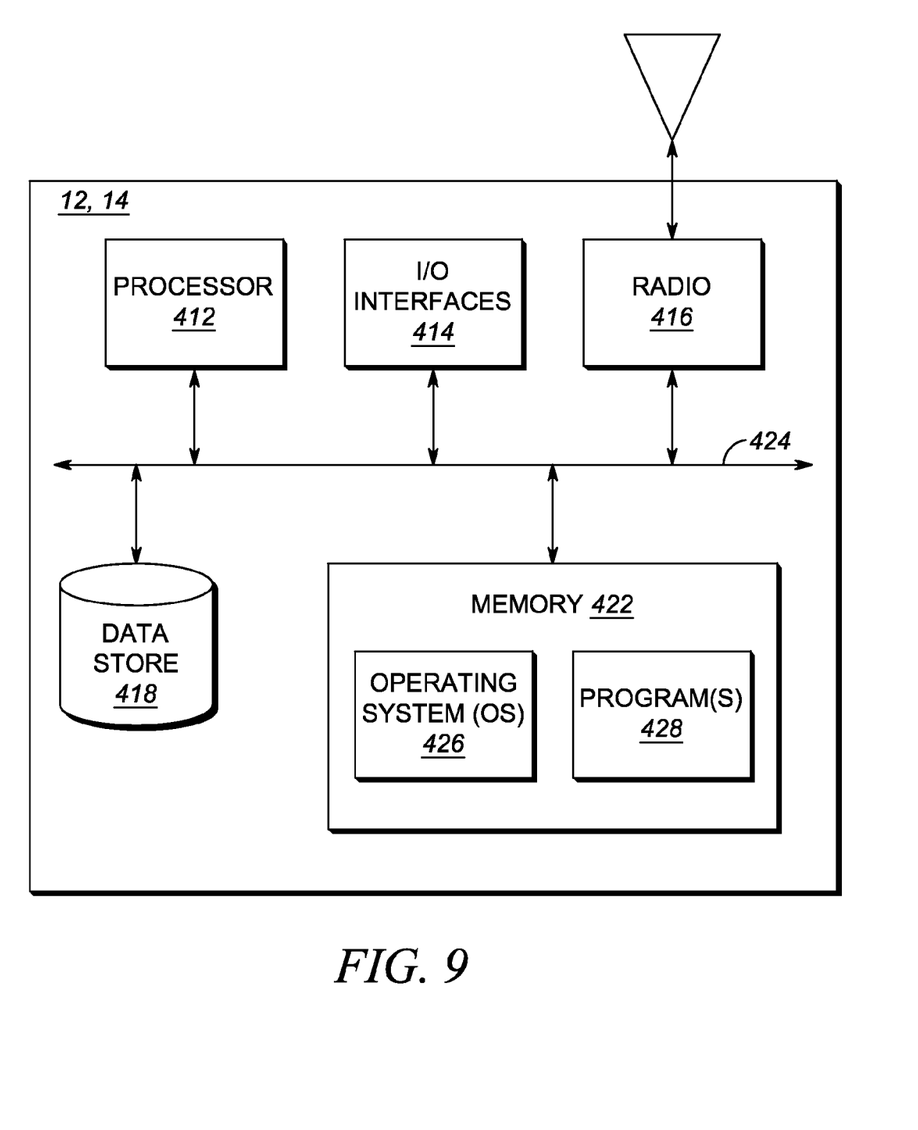
FIG. 9 is a block diagram of a mobile device for use in the system of FIG. 1, the methods of FIGS. 2, 3, 4, and 5, and the exemplary operations of FIGS. 6-7 in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring to FIG. 9, in an exemplary embodiment, a block diagram illustrates the mobile devices 12, 14 for use in the system 10 and the methods 30, 40, 50, 60. The mobile device 12, 14 can be a digital device that, in terms of hardware architecture, generally includes a processor 412, input/output (I/O) interfaces 414, a radio 416, a data store 418, and memory 422. It should be appreciated by those of ordinary skill in the art that FIG. 9 depicts the mobile device 12, 14 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 12, 14, a semiconductor-based microprocessor (in the form of a microchip or chip set), or generally any device for executing software instructions. When the mobile device 12, 14 is in operation, the processor 412 is configured to execute software stored within the memory 422, to communicate data to and from the memory 422, and to generally control operations of the mobile device 12, 14 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 12, 14. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 9, the software in the memory 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 12, 14. For example, exemplary programs 428 can include, but not limited to, a web browser, social networking applications, streaming media applications, games, mapping and location applications, electronic mail applications, financial applications, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An identification method, comprising:
    determining by a server a route for a first mobile device associated with a first entity;
    determining by the server a set of mobile devices within a predetermined radius of the first mobile device;
    determining by the server a route of each mobile device in the set of mobile devices; and
    identifying by the server each mobile device and associated second entity in the set of mobile devices with an associated route exhibiting a required correlation with the route of the first mobile device.

2. The identification method of claim 1, wherein the first entity comprises a public safety practitioner and the second entity comprises a non public safety practitioner.

3. The identification method of claim 1, wherein the required correlation comprises a predetermined distance at a predetermined time.

4. The identification method of claim 1, wherein the required correlation for each of the set of mobile devices requires an instantaneous location of the first mobile device be approximately equal to a previous location of each of the set of mobile devices.

5. The identification method of claim 1, wherein the previous location of each of the set of mobile devices is a location measured at a bounded time differential with respect to the instantaneous location.

6. The identification method of claim 1, further comprising:
    determining a first subset of mobile devices from set of mobile devices within X distance units of the first mobile device for inclusion in a candidate list; and
    determining a second subset of mobile devices from the set of mobile devices that have a location of within Z distance units of the first mobile device within +/−Y seconds for inclusion in the candidate list.

7. The identification method of claim 6, further comprising:
    determining a third subset of mobile devices from the second subset of mobile devices that have a heading within A degrees of the first mobile device over a number of time samples within +/−Y seconds for inclusion in the candidate list.

8. The identification method of claim 7, further comprising:
    determining a fourth subset of mobile devices from the third subset of mobile devices that have a speed within B mph of the first mobile device over a number of time samples within +/−Y seconds for inclusion in the candidate list; and
    identifying each of the set of mobile devices based on the first subset, the second subset, the third subset, and the fourth subset.

9. The identification method of claim 1, wherein the route for a first mobile device comprises an arbitrary route not tied to a particular road or static route.

10. An identification method, comprising:
    determining by a server a route for a first mobile device;
    determining by the server a route for each of a plurality of mobile devices;
    correlating by the server the route for each of the plurality of mobile devices with the route for the first mobile device; and identifying by the server each of the plurality of mobile devices with their associated routes approximately matching the route of the first mobile device.

11. The identification method of claim 10, further comprising:
receiving a plurality of parameters for the first mobile device and each of the plurality of mobile devices;
storing the plurality of parameters each with a timestamp associated therewith; and
determining the route for the first mobile device and for each of the plurality of mobile devices based on the plurality of parameters and the timestamps associated therewith.

12. The identification method of claim 10, wherein the correlating step includes each of the plurality of mobile devices in a candidate list which exhibit a required correlation in their routes to the route of the first mobile device.

13. The identification method of claim 12, wherein the required correlation comprises a predetermined distance at a predetermined time.

14. The identification method of claim 12, wherein the required correlation for each of the plurality of mobile devices requires an instantaneous location of the first mobile device be approximately equal to a previous location of each of the plurality of mobile devices.

15. The identification method of claim 14, wherein the previous location of each of the plurality of mobile devices is a location measured at a bounded time differential with respect to the instantaneous location.

16. The identification method of claim 10, wherein the correlating step comprises:
determining a first subset of mobile devices from the plurality of mobile devices within X distance units of the first mobile device for inclusion in a candidate list; and
determining a second subset of mobile devices from the first subset of mobile devices that have a location of within Z distance units of the first mobile device within +/−Y seconds for inclusion in the candidate list.

17. The identification method of claim 16, wherein the correlating step further comprises:
determining a third subset of mobile devices from the second subset of mobile devices that have a heading within R degrees of the first mobile device over a number of time samples within +/−Y seconds for inclusion in the candidate list.

18. The identification method of claim 17, wherein the correlating step further comprises:
determining a fourth subset of mobile devices from the third subset of mobile devices that have a speed within B mph of the first mobile device over a number of time samples within +/−Y seconds for inclusion in the candidate list; and
identifying each of the plurality of mobile devices based on the first subset, the second subset, the third subset, and the fourth subset.

19. The identification method of claim 10, wherein the route for the first mobile device comprises a dynamic route not tied to a particular road or static route.

* * * * *